United States Patent [19]

Moriya et al.

[11] Patent Number: 4,531,366

[45] Date of Patent: Jul. 30, 1985

[54] HYDRAULIC CIRCUIT SYSTEM FOR USE IN SWIVEL TYPE EXCAVATORS

[75] Inventors: Yukio Moriya, Hirakata; Tadashi Yoda, Komatsu; Hisashi Fukumoto, Hirakata, all of Japan

[73] Assignee: Kabushiki Kaisha Komatsu Seisakusho, Tokyo, Japan

[21] Appl. No.: 382,849

[22] Filed: May 27, 1982

[30] Foreign Application Priority Data

May 29, 1981 [JP] Japan ................................ 56-080803

[51] Int. Cl.[3] ........................ F15B 13/06; F16H 39/46

[52] U.S. Cl. ........................................ 60/421; 60/420; 60/427; 60/428; 60/450; 417/216

[58] Field of Search ................ 60/420, 421, 427, 428, 60/450, 447, 452, 484; 417/216

[56] References Cited

U.S. PATENT DOCUMENTS

| | | | |
|---|---|---|---|
| 3,732,036 | 5/1973 | Busbey et al. | 417/216 |
| 3,841,795 | 10/1974 | Ferre et al. | 417/216 |
| 4,248,573 | 2/1981 | Uehara et al. | 60/447 |
| 4,248,574 | 2/1981 | Uehara et al. | 417/216 |

FOREIGN PATENT DOCUMENTS 55-145219 11/1980 Japan .

*Primary Examiner*—Irwin C. Cohen

*Attorney, Agent, or Firm*—Armstrong, Nikaido, Marmelstein & Kubovcik

[57] ABSTRACT

There is disclosed a hydraulic circuit system for use in a swivel type excavator. The circuit system having a plurality of variable displacement pumps for supplying pressurized fluid for manipulations of work implements and swivel means of the excavator, and control means operative to automatically adjust pump displacement to the output hosepower of a prime mover driving the pumps. The control means includes hydraulic pressure detector means, servo-control means respectively provided in the pumps, negative control valves for respectively controlling the servo-control means by the action of the pressure detector means, cut off valves respectively connected in series with the negative control valves, and summing valves respectively connected in series with some of the cut off valves so as to control pressurized fluid to be supplied into the servo-control means by the action of the fluid pressure delivered from the pumps.

5 Claims, 7 Drawing Figures

HYDRAULIC CIRCUIT SYSTEM FOR USE IN SWIVEL TYPE EXCAVATORS

BACKGROUND OF THE INVENTION

1. Field of the Invention

This invention relates to a hydraulic circuit system for use in swivel type excavators, and in particular to a hydraulic circuit system for controlling variable displacement pumps so as to reduce hydraulic fluid flow delivered by the pumps to minimum when operation control valves for controlling manipulations of work implements are located at their respective neutral positions.

2. Description of the Prior Art

There have so far been proposed several hydraulic circuit systems such as, for example, Japanese patent application No. 51536/1972 in which, for the purpose of achieving an energy saving, control of variable displacement pumps can be made so as to reduce the flow rate of hydraulic fluid delivered thereby to minimum when work implements are not operated. However, the above-mentioned prior art hydraulic circuit system has been disadvantageous in that, when swivel operation control valves are operated to swivel the upper swivel body, hydraulic fluid flow delivered by the variable displacement pumps tends to be compensated with one another, so that a proper flow rate of hydraulic fluid required for swivelling the upper swivel body cannot be obtained.

SUMMARY OF THE INVENTION

The present invention has been contemplated in view of the above-mentioned circumstances and for the purpose of eliminating the above-mentioned disadvantages of the prior art hydraulic circuit system.

It is an aspect of the present invention to provide a hydraulic circuit system in which, when swivel apparatus and all the work implements are not operated, the flow rate of hydraulic fluid delivered by a plurality of variable displacement pumps may be reduced to a minimum thereby reducing the power loss and preventing the generation of noise and increase in temperature of hydraulic fluid within the circuit.

It is another aspect of the present invention to provide a hydraulic circuit system comprising negative control valves and cut off valves respectively connected in series with servo-mechanisms which control the flow rate of hydraulic fluid delivered by variable displacement pumps, respectively, thereby enabling the flow rate of hydraulic fluid delivered by said variable displacement pumps to be controlled to avoid abnormal hydraulic fluid pressure increase and also enabling the prevention of pressure loss and reduction in the level of noise to be achieved.

It is a further aspect of the present invention to provide a hydraulic circuit system comprising power control valves (or summing valves) so as to fully utilize the output of a prime mover which drives the variable displacement pumps and to control the output of the latter not to exceed the preformance of the prime mover.

In order to achieve the afore-mentioned aspects of the present invention, there is provided a hydraulic circuit system for use in swivel type excavators which comprises mutually independent at least first to fourth variable displacement pumps; swivel operation control valves arranged to join hydraulic fluid under pressure delivered by a plurality of variable displacement pumps and allow the joined hydraulic fluid to flow into a swivel motor and also arranged at their respective neutral positions to join hydraulic fluid respectively delivered by said pumps with hydraulic fluid respectively delivered by the other pumps, respectively, and allow the latter joined hydraulic fluid to flow into operation control valve groups, respectively, which serve to control the operation of work implements; said operation control valve groups each comprising a plurality of operation control valves adapted to supply pressurized hydraulic fluid introduced into the operation control valve groups into a plurality of running motors and respective cylinders for the work implements; pressure detector means connected to the outlets of said operation control valve groups, respectively, and adapted to detect the pressure of pressurized hydraulic fluid delivered when all of the operation control valves are located at their respective neutral positions; negative control valves adapted to control servo-mechanisms for said first to fourth variable displacement pumps by the action of the hydraulic pressure detected by means of said pressure detectors so as to reduce the flow rate of hydraulic fluid delivered by said variable displacement pumps to a minimum; cut off valves connected in series with said negative control valves and adapted to limit the fluid pressure supplied into the servo-mechanisms when said first to fourth variable displacement pumps has become abnormally high; and power control valves connected in series with some of said cut off valves and arranged to receive the fluid pressure delivered by said first to fourth variable displacement pumps and control the pressurized fluid to be supplied into the servo-mechanisms so as not to allow the hydraulic pressure delivered by said first to fourth variable displacement pumps to exceed the capacity of the prime mover driving the same and so as to drive said first to fourth variable displacement pumps with a constant output.

Many other advantages, features and additional objects of the present invention will become manifest to those versed in the art upon making reference to the detailed description and accompanying drawings in which preferred structural embodiments incorporating the principles of the present invention are shown by way of illustrative example.

DETAILED DESCRIPTION OF THE INVENTION

Figure 1:
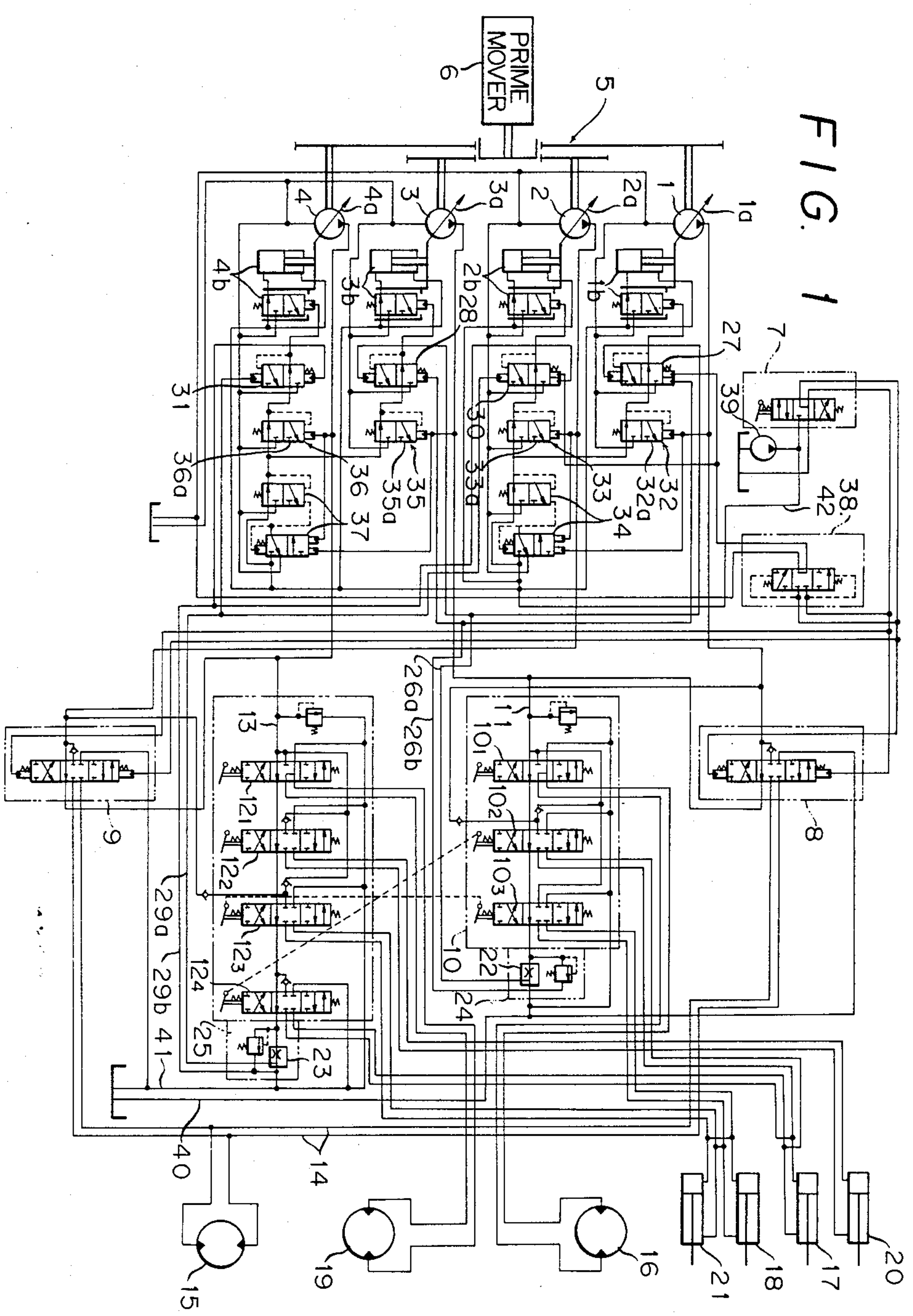
FIG. 1 is an overall hydraulic circuit diagram.

The present invention will now be described in detail by way of example only with reference to the accompanying drawings.

In the drawings, reference numerals 1 to 4 denote first, second, third and fourth variable displacement pumps having the same capacity arranged to be simultaneously driven, respectively, by a common prime mover 6 through a power transmission unit 5. Out of the first to the fourth variable displacement pumps 1 to 4, hydraulic fluid under pressure delivered by the first and second variable displacement pumps 1 and 2 is supplied into two swivel operation control valves 8 and 9 (hereinafter merely referred to as swivel valves) which are controlled by a swivel pilot valve 7. When the swivel valves 8 and 9 are located at their neutral positions, hydraulic fluid under pressure delivered by the first displacement pump 1 will join that delivered by the third variable displacement pump 3 and flow into a main conduit 11 leading to an operation control valve group 10, whilst pressurized hydraulic fluid delivered by the second variable displacement pump 2 will join that sent out by the fourth variable displacement pump 4 and flow into a main circuit 13 leading to another operation control valve group 12. Further, when the swivel valves 8 and 9 are operated, hydraulic fluid under pressure delivered by the first and second variable displacement pumps 1 and 2 and flowing through the swivel valves 8 and 9, respectively, will join in a conduit 14 and then flow into a swivel motor 15 which is arranged to swivel or drive an upper swivel body of a swivel type excavator not shown.

Out of the operation control valve groups 10 and 12, the operation control valve group 10 comprises a left side running control valve $10_1$, an arm operation control valve $10_2$ and a boom operation control valve $10_3$. The arrangement is made such that pressurized hydraulic fluid delivered through the left side running control valve $10_1$ is supplied into a left side running motor 16 to drive it; pressurized hydraulic fluid sent out through the arm operation control valve $10_2$ is supplied into an arm cylinder 17 to drive an arm not shown; and hydraulic fluid under pressure sent out through the boom operation control valve $10_3$ is supplied into a boom cylinder 18 to drive a boom not shown. Another operation control valve group 12 compises a right side running control valve $12_1$, a bucket operation control valve $12_2$, a boom operation accelerating valve $12_3$ and an arm operation accelerating valve $12_4$. The arrangement is made such that pressurized hydraulic fluid sent out through the right side running control valve $12_1$, is supplied into a right side running motor 19 to drive the motor 19; pressurized hydraulic fluid sent out through the bucket operation control valve $12_2$ is supplied into a bucket cylinder 20 to drive a bucket not shown; pressurized hydraulic fluid discharged through the boom operation accelerating valve $12_3$ will flow into a boom cylinder 21 to drive a boom not shown; and hydraulic fluid under pressure discharged through the arm operation accelerating valve $12_4$ is supplied into the aforementioned arm cylinder 17 to drive the arm not shown.

Figure 2:
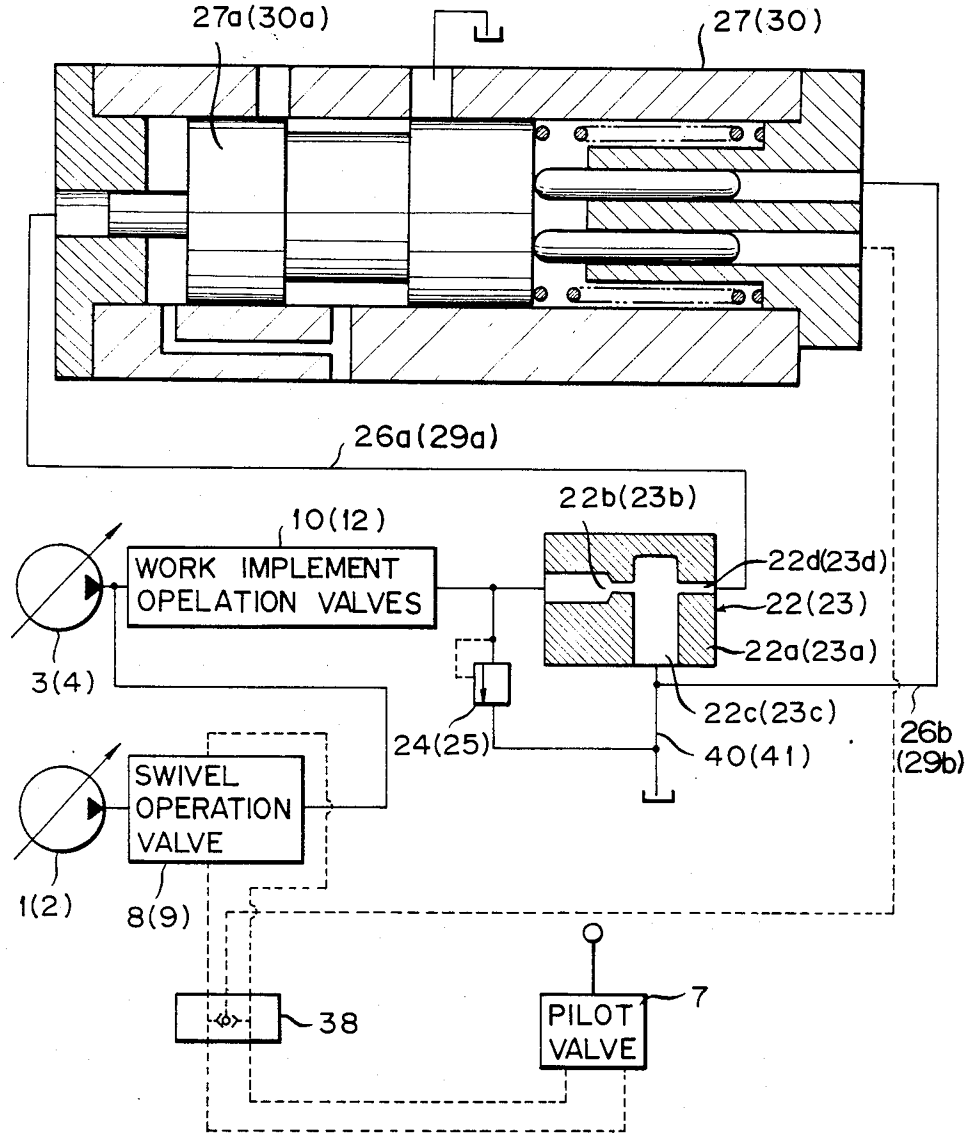
FIG. 2 is a detailed view of a negative control valve.

When the control valves $10_1$ to $10_3$ of the operation control valve group 10 and the control valves $12_1$ to $12_4$ of another operation control valve group 12 are located at their respective neutral positions, pressurized hydraulic fluid flowing into main conduits 11 and 13 will pass through the control valves $10_1$ to $10_3$ and $12_1$ to $12_4$ into the outlet of each of the operation control valve groups 10 and 12. Then, hydraulic fluid will pass through pressure detectors 22 and 23 connected to the outlets, respectively, into respective drain conduits 40 and 41. The above-mentioned pressure detectors 22 and 23 includes, for example as depicted in FIG. 2, dynamic pressure detector bodies 22*a* and 23*a* having internal restrictors 22*b* and 23*b*, respectively. Pressurized hydraulic fluid which has passed through the respective restrictors 22*b* and 23*b* will pass through drain ports 22*c*, 23*c* into drain conduits 40 and 41, respectively. Formed opposite to the restrictors 22*b* and 23*b*, respectively, and between the restrictors and the drain ports 22*c* and 23*c* are dynamic pressure detection or outlet ports 22*d* and 23*d*, respectively, which are arranged to take out pressurized hydraulic fluid as dynamic pressure. The dynamic pressure taken out through the outlet port 22*d* is introduced as a pilot pressure through a conduit 26*a* into each one end of negative control valves 27 and 28 provided in the first and third variable displacement pumps 1 and 3, respectively. Whilst, pressurized hydraulic fluid taken out through the dynamic pressure outlet port 23*d* is introduced as a pilot pressure through a conduit 29*a* into each one end of negative control valves 30 and 31 provided in the second and fourth variable displacement pumps 2 and 4, respectively. Further, pressurized hydraulic fluid passing through the drain ports 22*c* and 23*c* of the pressure detectors 22 and 23 and the drain conduits 40 and 41, respectively, is introduced as a pilot pressure through conduits 26*b* and 29*b*, respectively, into the other end of each of the above-mentioned negative control valves 27, 28, 30 and 31. Still further, connected in parallel with the pressure detectors 22 and 23 are relief valves 24 and 25, respectively.

The aforementioned first to fourth variable displacement pumps 1 to 4 have swash plates 1*a* to 4*a* provided with servo-mechanisms 1*b* to 4*b*, respectively. Further, connected in series with the servo-mechanism 1*b* of the first variable displacement pump 1 are the aforementioned negative control valve 27 and a cut off valve 32, whilst connected in tandem with the servo-mechanism 2*b* of the second variable displacement pump 2 are the aforementioned negative control valve 30, a cut off valve 33 and a power control valve (or summing valve) 34. Further, connected in series with the servo-mechanism 3*b* of the third variable displacement pump 3 are the negative control valve 28 and a cut off valve 35. Moveover, connected in tandem with the servo-mechanism 4*b* of the fourth variable displacement pump 4 are the aforementioned negative control valve 31, a cut off valve 36 and a power control valve 37. Out of the aforementioned negative control valves 27, 28, 30 and 31, each of the negative control valves 27 and 30 has the other end into which a hydraulic fluid pressure on the higher side of the pilot pressure supplied through the swivel pilot valve 7 from a fixed displacement pump 39 into the swivel valve 8 is introduced through a shuttle valve 38. This pilot pressure and the hydraulic fluid pressure introduced through the drain conduits 40 and 41 of the aforementioned pressure detectors 22 and 23, respectively, urges the spools 27*a* and 30*a* of the negative control valves 27 and 30, respectively, as shown in FIG. 2. A part of hydraulic fluid pressure supplied through a conduit 42 from the fixed displacement pump 39 is introduced into the servo-mechanism 1*b* to 4*b* of the first to fourth variable displacement pumps 1 to 4.

Thus, hydraulic fluid under pressure delivered by the first and fourth variable displacement pump 1 and 4, out of the first to fourth variable displacement pump 1 to 4, will flow into the swivel valves 8 and 9, respectively. When the swivel valves 8 and 9 are located at respective neutral positions, pressurized hydraulic fluid will join those delivered by the second and third variable displacement pumps 2 and 3 and flow through the main conduits 11 and 13 and through the control valves $10_1$ to $10_3$ and $12_1$ to $12_4$ within the operation control valve groups 10 and 12, respectively, and then into the boom cylinders 18 and 21, the bucket cylinder 20, the arm cylinder 17 and the running motors 15 and 19, respectively, of work implements not shown. Further, when the control valves $10_1$ to $10_3$ and $12_1$ to $12_4$ of the operation control valve groups 10 and 12 are located at their neutral positions, pressurized hydraulic fluid will pass through the control valves $10_1$ to $10_3$ and $12_1$ to $12_4$ into the outlets of the operation control valve groups 10 and 12, respectively, from which the hydraulic fluid will pass through the restrictors 22b and 23b of the pressure detectors 22 and 23, respectively, into respective drain conduits 40 and 41. The variance in the pressure of hydraulic fluid passing through the restrictors 22b, 23b of the pressure detectors 22, 23 is taken out through outlet ports 22d, 23d, respectively, as a dynamic pressure which is then supplied as a pilot pressure through the conduits 26a and 29a, respectively, into one end of each of the negative control valves 27, 28, 30 and 31 connected, respectively, to the servo-mechanisms 1b to 4b of the first to fourth variable displacement pumps 1 to 4. At that time, the dynamic pressure is higher than the hydraulic pressure within the drain ports 22c and 23c. (Refer to FIG. 2) Therefore, the spools 27a, 28a, 30a and 31a slidably mounted within the negative control valves 27, 28, 30 and 31 are urged to the right under the influence of the dynamic pressure derived from the pressure detectors 22 and 23, respectively. (Refer to FIG. 2) As a result, the supply of pressurized hydraulic fluid into the servo-mechanisms 1b to 4b through the cut off valves 32, 33, 35 and 36, respectively, will be cut off or interrupted so as to control the tilting angle of the swash plates 1a to 4a so that the amount of hydraulic fluid delivered by the first to fourth variable displacement pumps 1 to 4 may be reduced to minimum. By such an arrangement, when the operation control valve groups 10 and 12 are not operated, the flow rate of pressurized hydraulic fluid delivered by the first to fourth variable displacement pumps 1 to 4 will be reduced to minimum so that the power loss can be reduced and the generation of noise can be prevented, and further the increase in temperature of hydraulic fluid within the circuit can be prevented.

Figure 3A:
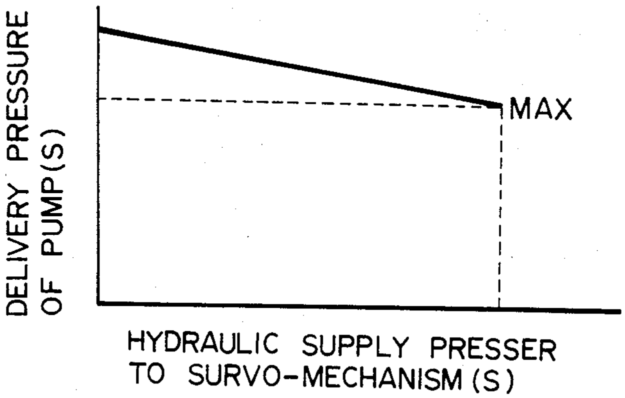
FIGS. 3A and 3B are diagrams showing the operations of the negative control valve.
Figure 3B:
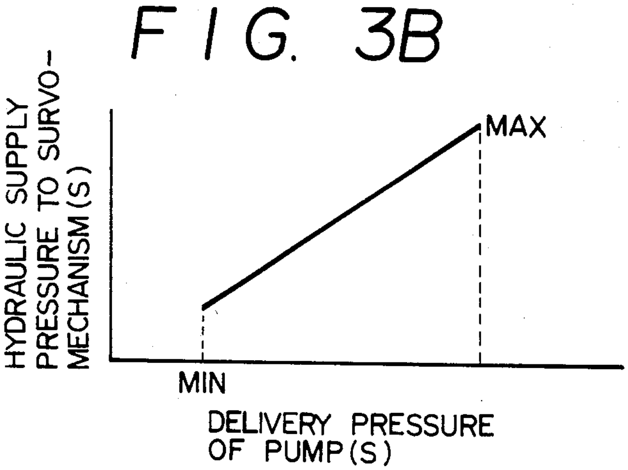

Further, the relationship between the power provided by the pressure detectors 22, 23 and the fluid pressure supplied into the servo-mechanisms 1b to 4b in the aforementioned operation is shown in FIG. 3A. Further, the relationship between the hydraulic fluid pressure supplied into the servo-mechanisms 1b to 4b and the flow rate of hydraulic fluid delivered by the variable displacement pumps 1 to 4 is as shown in FIG. 3B.

Whilst, if the swivel valves 8 and 9 are manipulated to commence swivelling action when the operation control valve groups 10 and 12 are located at their respective neutral positions, a part of pressurized hydraulic fluid supplied through the swivel pilot valve 7 from the fixed displacement pump 39 into the swivel valves 8 and 9 will be supplied as a pilot pressure through the shuttle valve 38 into the negative control valves 27 and 30 of the first and second variable displacement pumps 1 and 2, respectively, so that the spools 27a and 30a located within the negative control valves 27 and 30, respectively, may be moved to the left against the dynamic pressure exerted on the opposite side thereof. Consequently, pressurized hydraulic fluid which has been drained is supplied into the servo-mechanisms 1b and 2b of the first and second variable displacement pumps 1 and 2 to thereby control the tilting rotary angle of the swash plates 1a and 2a so that the flow rate of hydraulic fluid delivered by the first and second variable displacement pumps 1 and 2 can be increased to maximum. As a result, swivel motor 15 is supplied with hydraulic fluid flow jointly discharged by the pumps 1 and 2. Therefore, the swivel function is not affected at all and, in case of swivelling the upper swivel body finely, the aforementioned pilot pressure for swivel operation and the dynamic pressure detected in and derived from the pressure detectors 22 and 23 are exerted on the opposite ends of the spools 27a and 30a of the negative control valves 27 and 30, respectively. Therefore, even in the case of operating the work implements such as the boom etc. simultaneously with the fine swivel operation, hydraulic fluid will be supplied into the servo-mechanisms 1b and 2b at a total flow rate required for both operations.

In brief, in the hydraulic fluid pressure feedback system of the circuit means according to the present invention, pressurized hydraulic fluid jointly delivered by the pumps 1 and 3 or the pumps 2 and 4 is detected by the pressure detectors 22 or 23 having the restrictor and fed back so that when the swivel valve and the valves for the work implements are all located at their neutral positions the feedback system is rendered operative effectively, but when, upon swivelling, one of the swivel valves is located at an operating position, the hydraulic fluid pressure delivered by the pump 1 or 2 supplying hydraulic fluid into the swivel motor cannot be fed back. Therefore, the arrangement is made such that at the time of swivelling, a part of the pilot pressure for the swivel operation which actuates swivel valve 8 or 9 is supplied through the shuttle valve 38 into the negative control valve 27 or 30 of the motor used for the swivel operation thereby enabling a pressure balance to be kept with the pump for work implements not used for the swivel operation, for example, the pump 3 or 4.

Figure 4:
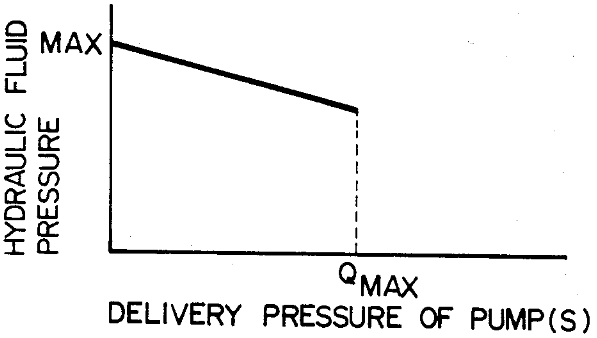
FIG. 4 is a diagram showing the function of a cut off valve.

Further, the cut off valves 32, 33, 35 and 36 are connected in series with the negative control valves 27, 28, 30 and 31, respectively, of the first to fourth pumps 1 to 4, and further power control valves 34 and 37 are connected in series with the cut off valves 33 and 36, respectively, of the second and fourth pumps 2 and 4. Therefore, in case the hydraulic fluid pressure delivered by each of the first to fourth variable displacement pumps 1 to 4 has become abnormally high, each of the cut off valves 32, 33, 35 and 36 will be located at their respective cut-off positions 32a, 33a, 35a and 36a to thereby allow a part of pressurized hydraulic fluid supplied into the servo-mechanisms 1b to 4b to be drained into fluid suction conduits for the pumps 1 to 4. As a result, the flow rate of hydraulic fluid delivered by each of the variable displacement pumps 1 to 4 will be reduced rectilinearly as shown in FIG. 4 so that the generation of abnormal pressure rise can be avoided. In addition, since the generation of an abnormal pressure rise can be avoided by the amount of hydraulic fluid delivered by the pumps in stead of relieving the hydraulic fluid pressure by means of a relief valve in case of the prior art hydraulic circuit system, the prevention of power loss and reduction in level of the noise caused by the relief valve can be achieved.

Figure 5:
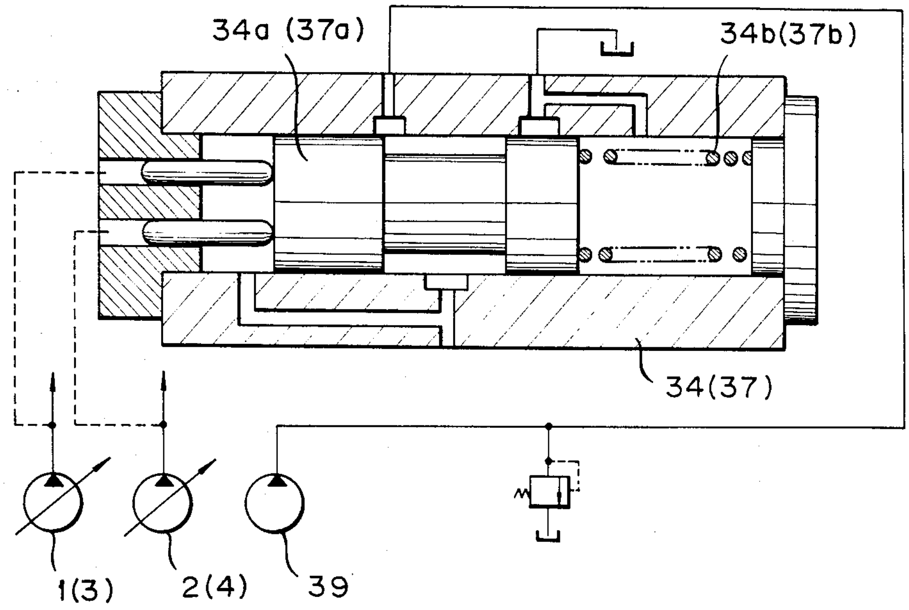
FIG. 5 is a detailed view of a power control valve.
Figure 6:
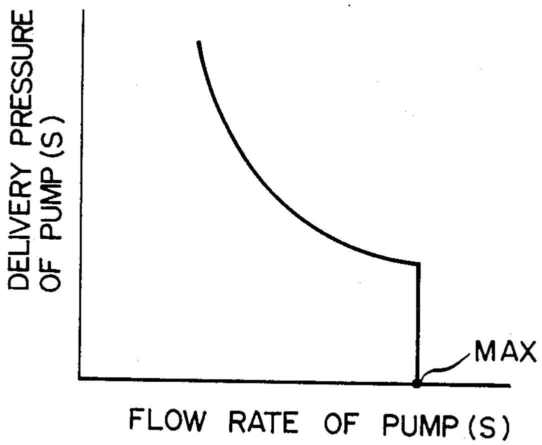
FIG. 6 is a diagram showing the function of the power control valve.

Whilst, the power control valves 34 and 37 provided in the second and fourth variable displacement pumps 2 and 4 serve to control the hydraulic fluid pressure to be supplied into the servo-mechanisms 1b to 4b so as not to allow hydraulic fluid delivered by the action of said first to fourth pumps 1 to 4 to exceed the performance of the prime mover 6 and so as to drive said first to fourth pumps with a constant output. The power control valves 34 and 37 are constructed as shown in FIG. 5. In brief, respective hydraulic fluid pressure delivered by the first and second variable displacement pumps 1 and 2 is introduced as a pilot pressure into one end of the power control valve 34 to urge the spool 34*a*, whilst respective hydraulic fluid pressure delivered by the third and fourth variable displacement pumps 3 and 4 is introduced as a pilot pressure into one end of the power control valve 37. Further, compression springs 34*b* and 37*b* are mounted on the opposite sides of the spools 34*a* and 37*a*, respectively. Therefore, by coming to a balance between the pilot pressure and the resilient force of the spring 34*b* or 37*b*, pressurized hydraulic fluid to be supplied into the servo-mechanisms 1*b* to 4*b* of the pumps 1 to 4 is controlled so that the relationship between the pressure and the flow rate of hydraulic fluid delivered by each of the pumps 1 to 4 will become as shown in FIG. 6. As a result, the output of the prime mover 6 can be fully utilized and also it becomes possible to prevent the output of the pumps to exceed the performance of the prime mover 6.

Further, in the above-mentioned embodiment, the pressure detectors 22 and 23 are used as dynamic pressure detectors; instead a mere restrictor or orifice may be provided to detect the difference between the pressures upstream and downstream of the restrictor so that the negative control valves are controlled by the signal (hydraulic fluid pressure) thus detected.

It is to be understood that the foregoing description is merely illustrative of a preferred embodiment of the invention, and that the scope of the invention is not to be limited thereto, but is to be determined by the scope of the appended claim.

We claim:

1. A hydraulic circuit system for use in swivel type excavators, said system having swivel motors, running motors, work implements and respective cylinders, which comprises at least first to fourth mutually independent variable displacement pumps, each having a fluid-actuated swash plate servo-mechanism;

a plurality of pilot-operated swivel operation control valve means controlled by pilot control means, said control valve means arranged to join hydraulic fluid under pressure delivered by a plurality of said first to fourth variable displacements pumps and allow the joined hydraulic fluid to flow into said swivel motor and also arranged at their respective neutral positions to join hydraulic fluid respectively delivered by said pumps with hydraulic fluid respectively delivered by the other pumps, respectively, and allow the latter joined hydraulic fluid to flow into operation control valve groups, respectively, which serve to control manipulations of work implements;

a plurality of operation control valve means for supplying pressurized hydraulic fluid introduced into the operation control valve groups into said plurality of running motors and respective cylinders for the work implements;

pressure detector means connected to the outlets of said operation control valve groups, respectively, for detecting the pressure of pressurized hydraulic fluid delivered when all of the operation control valves are located at their respective neutral positions;

a plurality of negative control valve means for controlling respective servo-mechanism of said first to fourth variable displacement pumps by the action of the pressure detected by means of said pressure detector means so as to reduce the flow rate of hydraulic fluid delivered by said variable displacement pumps to a minimum;

a plurality of cut off valve means connected in series with said negative control valve means for limiting the hydraulic fluid pressure supplied into the servo-mechanism when the hydraulic fluid pressure delivered by said first to fourth variable displacement pumps has become abnormally high; and a plurality of power control valve means connected in series with said cut off valve means for use with the second and fourth variable displacement pumps and arranged to receive the hydraulic fluid pressure delivered by said first to fourth variable displacement pumps and control pressurized hydraulic fluid to be supplied into the servo-mechanisms so as not to allow the hydraulic fluid pressure delivered by said first to fourth variable displacement pumps to exceed the performance of a prime mover driving the pumps and so as to drive said first to fourth variable displacement pumps with a constant output.

2. A hydraulic circuit system as claimed in claim 1, further comprising a fixed displacement pump to generate a pilot pressure for the operation of the swivel operation control valve means.

3. A hydraulic circuit system as claimed in claim 2 wherein a swivel pilot valve is provided in a hydraulic fluid conduit connected between the fixed displacement pump and the swivel operation control valve means.

4. A hydraulic circuit system as claimed in claim 2 wherein each one end of the negative control valve means for use with the first and second variable displacement pumps is subjected to a supply of a partial pilot pressure delivered through a shuttle valve from the fixed displacement pump.

5. A hydraulic circuit system as claimed in claim 2, a part of the hydraulic fluid pressure delivered by the fixed displacement pump is introduced into the servo-mechanisms so as to control respective tilting rotary angle of swash plates of said servo-mechanisms.

* * * * *